No. 853,187. PATENTED MAY 7, 1907.
J. McAULIFF.
DRIVING GEAR FOR BICYCLES.
APPLICATION FILED OCT. 6, 1906.
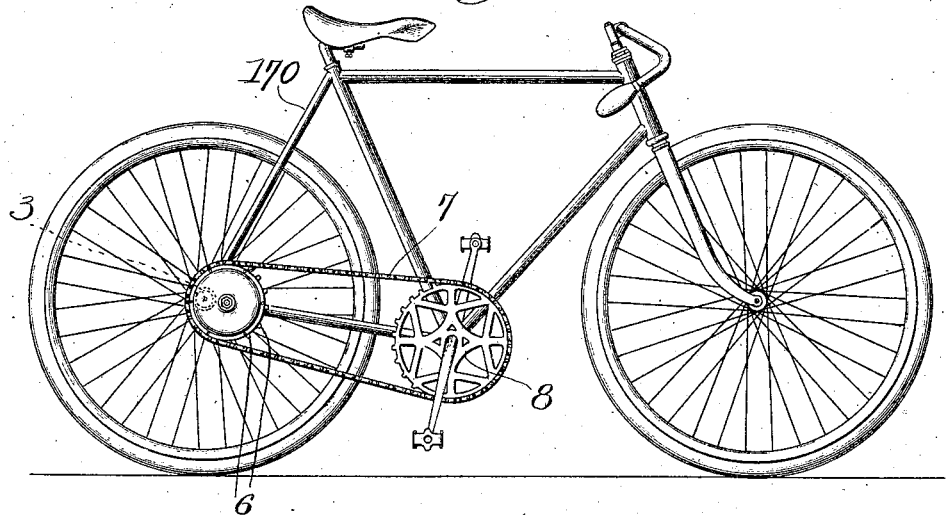
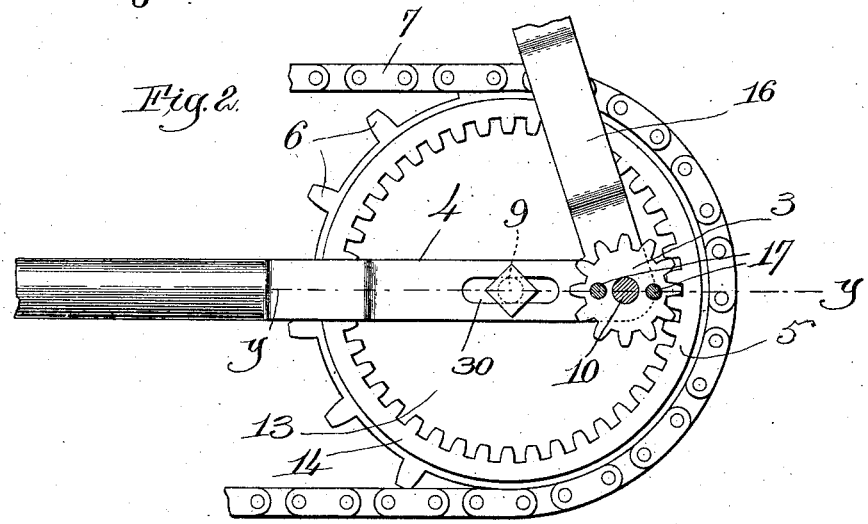
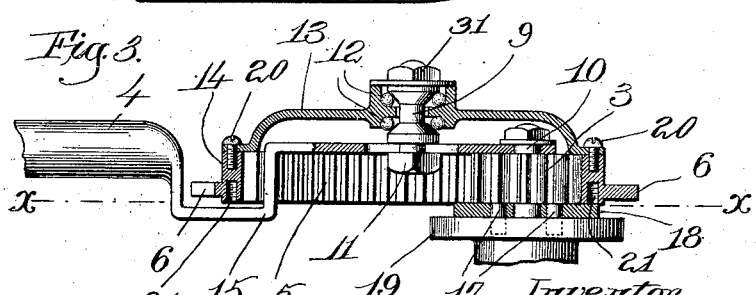
Witnesses.
Thomas J. Drummond
Joseph M. Ward
Inventor.
John McAuliff,
by Henley Gregory
attys.

UNITED STATES PATENT OFFICE.

JOHN McAULIFF, OF BOSTON, MASSACHUSETTS.

DRIVING-GEAR FOR BICYCLES.

No. 853,187.  Specification of Letters Patent.  Patented May 7, 1907.

Application filed October 6, 1906. Serial No. 337,711.

*To all whom it may concern:*

Be it known that I, JOHN McAULIFF, a citizen of the United States, residing in Boston, in the county of Suffolk and State of Massachusetts, have invented an Improvement in Driving-Gear for Bicycles, of which the following description, in connection with the accompanying drawings, is a specification, like letters on the drawings representing like parts.

The present invention is an improvement upon that class of driving gears for bicycles in which a small pinion fast to the rear wheel is driven by a larger internal gear carried by the frame.

In prior devices of this class, so far as I am aware, the larger internal gear which is driven by a sprocket chain from the ordinary crank sprocket is situated inside of the frame, a construction which is rather complicated and expensive to manufacture. I have improved and simplified this form of driving gearing by mounting the larger internal gear upon the outside of the frame, so that it can be readily removed or put in place without disturbing any of the other parts of the gearing.

The particular features of my invention will be more fully described in the following specification and pointed out in the appended claims.

In the drawings, Figure 1 is a side view of a bicycle embodying my invention; Fig. 2 is a section on the line x—x, Fig. 3, looking upwardly, and Fig. 3 is a section on the line y—y, Fig. 2.

In carrying out my invention, I fix to the rear hub of the bicycle in some suitable way, a small pinion 3 and attach to the outside of one of the branches 4 of the rear fork of the frame a larger internal gear 5 which meshes with the pinion 3, said internal gear having sprocket teeth 6 thereon which are engaged by the ordinary sprocket chain 7 driven from the usual crank-sprocket 8. The internal gear 5 is mounted to rotate upon a stud 9 which is screwed or otherwise secured to the rear end of the branch 4 of the rear fork at a point in front of the usual axle 10 of the rear wheel. Said stud may be either screwed into said branch 4 of the rear-fork or passed through a slot 30 therein and held in place by a suitable nut 11, and the internal gear may be held on the stud by a suitable nut 31 at the end thereof, so that said gear may be removed either by removing it from the stud or by removing the stud and gear from the frame, and this may be accomplished without disturbing in any way any of the other elements of the bicycle.

I preferably will provide a suitable ball bearing 12 between the internal gear and the stud. Said internal gear may be either made in one piece, or in two pieces as herein illustrated in which latter case it comprises a central body portion 13 and the ring portion 14 which is secured thereto, and has the gear teeth 5 on its interior and the sprocket teeth 6 on its exterior, said ring portion forming a lateral flange extending from the body portion. In this form of my invention the ring portion is separate from the body portion but the two could be cast integral without departing from the invention.

The branch 4 of the rear-fork is non-bifurcated and is provided with the offset portion 15 in which the ring 14 of the internal gear operates, and the branch 16 of the rear strut 170 will be similarly offset for the same purpose.

It will be noted that the branch 4 of the rear fork is non-bifurcated and that the internal gear 5 is situated entirely on the outside thereof. The same thing is true of the branch 16 of the rear strut 170. By offsetting the branch 4 and the strut 16, as above described, and by making the branch and strut non-bifurcated it is possible to place the internal gear 5 entirely on the outside of the frame so that it can be quickly removed or put in place laterally without disturbing the other elements of the driving mechanism. This is of great advantage in cleaning and repairing the bicycle, and moreover, by simply removing the internal gear, which is the work of but a moment, the wheel is rendered useless except to the person who has possession of said gear. If therefore the owner of the wheel does not wish anybody to use it without his permission, he has simply to remove the internal gear and retain it in his possession.

The small pinion 3 will be secured to the rear hub in any suitable way. I prefer, however, to provide said pinion with pins 17 which extend through a bar or plate 18 and into apertures in the face of the ordinary sprocket 19. The plate or bar 18 will be secured to the face of the sprocket 19 in any suitable way and serves to more securely hold the pinion 3 in place. I prefer this construction because it makes it possible to apply my improved gearing to any ordinary bicycle, simply by thus securing the pinion 3 to the ordinary sprocket wheel on the rear hub and by providing the frame with the offsets 15 in which the internal gear is received.

It will be noted that the sprocket teeth 6 on the ring 14 are situated near one edge of the ring; furthermore, said ring 14 is detachably secured to the body portion 13 by means of screws 20, and the said ring 14 has on each side face screw-threaded sockets 21 for the reception of the screws 20. With this construction the position of the ring 14 on the body portion 13 may be reversed, and since the sprocket teeth 6 are placed non-centrally of the ring it is possible to arrange this ring with the teeth 6 nearer to or farther from the rear wheel. The purpose of this adjustment is to permit the rear sprocket to be properly alined with the crank sprocket 8.

By giving the gears the proper ratio the driving gear for the bicycle can be speeded up to any desirable extent.

While I have herein illustrated one form of the invention, I do not wish to be limited to the exact construction, as many changes in the details of construction may be made without departing from the invention expressed in the appended claims.

Having described my invention, what I claim as new and desire to secure by Letters Patent is:—

1. In a bicycle, a frame having a rear fork one leg of which is non-bifurcated and provided with an offset portion, a stud detachably secured to the outside of said leg, a driving member mounted on said stud and situated entirely outside of the leg, said driving member comprising a body portion and an annular flange having internal gear teeth, said flange being received by the offset portion of the frame, and a pinion fast on the hub of the rear wheel and meshing with the gear teeth of the driving member.

2. In a driving gear for bicycles, a plate or bar 18 fast to the outer face of the usual sprocket on the rear wheel, a pinion, pins 17 projecting therefrom and passing through said plate or bar into the sprocket wheel, an internal gear mounted on the outside of the frame and meshing with said pinion, and means to drive said gear.

3. In a bicycle, the combination with a frame having a rear fork provided with non-bifurcated leg presenting an offset portion, and a stud detachably secured to the outside of said leg, of a driving member mounted on said stud and situated entirely outside of the leg, said driving member comprising a body portion and an annular flange having internal gear teeth and external sprocket teeth situated non-centrally of the internal gear teeth and a pinion fast to the hub of the rear wheel and meshing with the gear teeth of the driving member.

4. In a bicycle, the combination with a frame having a rear fork one leg of which is non-bifurcated and is provided with an offset portion, of a stud detachably secured to the outside of said leg and adjustable longitudinally thereof, a driving member mounted on said stud and situated entirely outside of the leg, said driving member comprising a body portion and an annular flange having internal gear teeth, said flange being received by the offset portion of the frame, and a pinion fast on the hub of the rear wheel and meshing with the gear teeth of the driving member.

In testimony whereof, I have signed my name to this specification, in the presence of two subscribing witnesses.

JOHN McAULIFF.

Witnesses:
 LOUIS C. SMITH,
 MARGARET A. DUNN.